United States Patent
Smiechowski et al.

(10) Patent No.: US 11,317,187 B2
(45) Date of Patent: Apr. 26, 2022

(54) FOLDABLE HEADPHONES WITH MULTIPLE OPERATING MODES

(71) Applicant: Apple Inc., Cupertino, CA (US)

(72) Inventors: Christina J. Smiechowski, West Hollywood, CA (US); Carlos M. Santana, Granada Hills, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 16/810,080

(22) Filed: Mar. 5, 2020

(65) Prior Publication Data

US 2021/0084401 A1 Mar. 18, 2021

Related U.S. Application Data

(60) Provisional application No. 62/900,283, filed on Sep. 13, 2019.

(51) Int. Cl.
*H04R 1/10* (2006.01)
*G06F 3/16* (2006.01)

(52) U.S. Cl.
CPC .......... *H04R 1/1041* (2013.01); *G06F 3/165* (2013.01); *H04R 1/105* (2013.01); *H04R 1/1008* (2013.01); *H04R 1/1025* (2013.01); *H04R 1/1066* (2013.01); *H04R 2420/07* (2013.01)

(58) Field of Classification Search
CPC .. H04R 1/1041; H04R 1/1008; H04R 1/1025; H04R 1/105; H04R 1/1066; H04R 2420/07; G06F 3/165
USPC .......................................................... 381/74
See application file for complete search history.

(56) References Cited

U.S. PATENT DOCUMENTS

| | | | |
|---|---|---|---|
| 2006/0062417 A1* | 3/2006 | Tachikawa | H04R 1/1066 381/378 |
| 2012/0275615 A1* | 11/2012 | Kelly | H04R 5/04 381/74 |
| 2016/0337745 A1* | 11/2016 | Adams | H04R 1/1058 |

* cited by examiner

*Primary Examiner* — Paul Kim
*Assistant Examiner* — Douglas J Suthers
(74) *Attorney, Agent, or Firm* — Kilpatrick Townsend & Stockton LLP

(57) ABSTRACT

Headphones include left and right earpieces mounted to rotatable arms and connected by a resilient U shaped band. The left and right earpieces can be positioned by folded the earpieces inwards toward the headband or extending the earpieces away from the headband. A sensor can detect the position of the left and right earpieces and transition the headphones between three operating modes, including a playback mode, a standby mode, and an off mode.

17 Claims, 4 Drawing Sheets

FOLDABLE HEADPHONES WITH MULTIPLE OPERATING MODES

CROSS-REFERENCE TO RELATED APPLICATION

This application claims the benefit of and priority to U.S. Provisional Application No. 62/900,283, filed on Sep. 13, 2019, and titled "HEADPHONES," the content of which is herein incorporated by reference in its entirety for all purposes.

FIELD

This disclosure generally relates to headphones and, more specifically, to headphones with multiple operating modes.

BACKGROUND OF THE INVENTION

Headphones are commonly used to listen to content on electronic devices such as smart phones, tablet computers, laptop computers, televisions and the like. Some headphones are wireless headphones that are powered by one or more internal batteries. The batteries store a limited amount of charge that are depleted through operation of the headphones, requiring recharging before operation of the headphones can continue. Some of these wireless headphones have features like auto on/off and/or can enter a sleep mode to conserve battery power. The auto on/off and sleep modes can extend the battery life of the headphones but can inhibit a user's listening experience if not implemented in an intuitive and easily implemented manner.

BRIEF SUMMARY OF THE INVENTION

This disclosure describes various embodiments of headphones that include multiple power modes that enable the headphones to conserve battery power when the headphones are not being actively used. In some embodiments, the headphones can fold to automatically transition the headphones between three different power modes including a playback or ON mode, a sleep mode and an OFF mode. For example, both the left and right earpieces can be unfolded in a listening configuration triggering an operating mode for playback; one of the left or right earpieces can be folded with the other earpiece unfolded to trigger a standby mode where battery consumption is reduced but playback can quickly be resumed; and both the left and right earpieces can be folded inward into a storage configuration triggering the headphones to turn off. Folding the left and/or right earpieces to switch between power modes provides a simple and intuitive manner in which a user can change the operation mode of the headphones. For example, if a user is transporting the headphones and wants to conserve the battery power, the user can fold both earpieces into the storage configuration and the headphones will automatically switch to the off mode. Similarly, if a user wants to conserve battery for a period of time but wants to be able to quickly resume playback, one earpiece can be folded triggering the standby mode. The user can then unfold the folded earpiece to trigger the playback mode.

Headphones according to some embodiments can include a headband and left and right arms connected to the headband. The left and right arms can connected the left and right earpieces, respectively, to the headband and can each include sensors for detecting whether the arms (and thus the earpieces) are folded inward towards the headband or are in an unfolded state. The left and right arms can fold independently to transition between the different power modes.

A pair of headphones is disclosed and includes the following: a headband having first and second opposing ends; a first earpiece pivotally attached to the first end of the headband enabling the first earpiece to be moved between a first position in which the first earpiece is folded inward towards the headband and a second unfolded position; a second earpiece pivotally attached to the second end of the headband enabling the second earpiece to be moved between a first position in which the first earpiece is folded inward towards the headband and a second unfolded; one or more sensors that generate sensor data indicating whether each of the first and second earpieces are in the first or second position; a rechargeable battery; and control circuitry coupled to the sensor data from the one or more sensors and configured to set the pair of headphones in: (i) a playback mode when both the first and second earpieces are in the second position, (ii) in an off mode when both the first and second earpieces are in the first position, and (iii) in a third operating mode when one of the first earpiece 110 or second earpiece 120 is in the first position and the other of the first earpiece 110 or second earpiece 120 is in the second position, wherein when the headphones are in the third operating mode the headphones consume less power than in the playback mode but more power than when in the off mode.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF THE INVENTION

Figure 1:
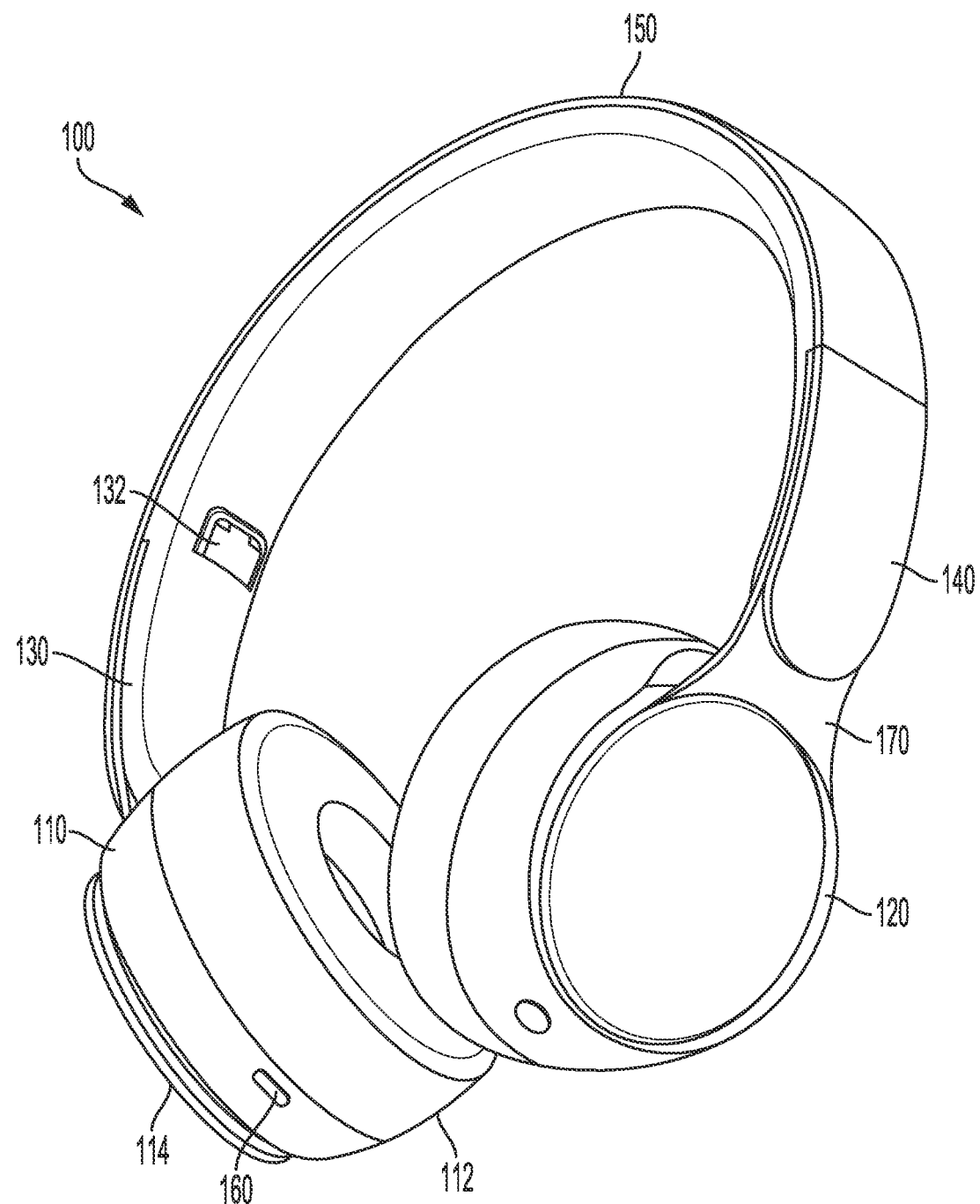
FIG. 1 shows a perspective view of headphones in accordance with some embodiments of the disclosure.

FIG. 1 shows a perspective view of headphones 100 in accordance with some embodiments of the disclosure. The headphones 100 can be, for example, over-ear or on-ear headphones. The headphones 100 can include a first earpiece 110 coupled with a first arm assembly 130 and a second earpiece 120 coupled with a second arm assembly 140. The first arm assembly 130 and the second arm assembly 140 can be interconnected by a headband 150 that in the depicted embodiment is substantially U-shaped or C-shaped to enable the headband to better conform to the contour of a user's head. The headphones 100 can include electronic circuitry and/or components (not shown in FIG. 1) for controlling various functions of the headphones 100. In various embodiments, the electronic circuitry and/or components can include a controller (e.g., a microcontroller, an ASIC, and/or various other logic circuitry and/or discrete components) for controlling audio playback, power modes, and/or communication. In some embodiments the controller can be positioned in the first earpiece 110 and/or the second earpiece 120.

The first earpiece 110 can include cushioning 112 for sitting against a user's head and a casing 114 surrounding the internal electronic components of the earpiece. The cushioning 112 can generally conform to the shape of the user's head and/or ear to minimize the travel of sound outside the cushioning. In some embodiments, the cushioning can include a protective layer of material, for example, leather, plastic, silicon, or any suitable material. As discussed further in reference to FIGS. 5 and 6, the casing 114 can include multiple portions, with one or more portions moveable to accommodate movement of one or more internal components.

In some embodiments, the first earpiece 110 can pivot relative to the first arm assembly 130. The first earpiece 110 can include electronic components for wireless communication (e.g., Bluetooth or Wi-Fi), one or more battery modules for powering the headphones 100, and/or one or more audio output components (e.g., one or more speakers) for output of audio data. The second earpiece 120 can include some or all of the same or similar components of the first earpiece 110 (e.g., cushioning, a casing, wireless communication components, a battery module, etc.).

In various embodiments, the first earpiece 110 and/or the second earpiece 120 can be mounted to position a central axis of the earpiece at an angle relative to a lateral centerline of the headband 150. The central axis of the first earpiece 110 and/or the second earpiece 120 can be, for example, angled between 80 degrees and 100 degrees relative to the lateral centerline of the headband 150.

In some embodiments, the first earpiece 110 and/or the second earpiece 120 can include a port 160. The port 160 can be mated with a corresponding cable for transmission of power and/or data to and/or from the headphones 100. For example, port 160 can be mated with a corresponding cable for electrically coupling the headphones 100 with an electronic device, such as a smart phone, tablet computer, laptop computer, power supply or other appropriate electronic device. In some instances the electronic device can transmit both power and audio data to the headphones 100 through port 160 via a cable. In other instances, however, the electronic device can transmit power to headphones 100 through the port 160 via the cable while audio data can be transmitted to the headphones 100 via wireless circuitry (e.g., Bluetooth or Wi-Fi circuitry). In some embodiments, the port 160 can include a receptacle connector, such as a TRS audio jack, a micro-USB connector, USB C connector, a Firewire connector, a lightning connector developed by Apple, or any other suitable type of connector.

The first arm assembly 130 and/or the second arm assembly 140 can be pivotally coupled with the headband 150 for pivoting between a first position (e.g., a folded position) and a second position (e.g., an extended position). As discussed further in reference to FIG. 4, in some embodiments, a pivot joint 132 can couple the first arm assembly 130 and/or the second arm assembly 140 with the headband 150.

In various embodiments, the first arm assembly 130 and/or the second arm assembly 140 can include a sliding member 170 for coupling the first earpiece 110 with the first arm assembly 130 and/or the second earpiece 120 with the second arm assembly 140. The sliding member 170 can slide internally and relatively to one end of the first arm assembly 130 and/or the second arm assembly 140 to shorten or lengthen the headband as described below.

The first arm assembly 130 and/or the second arm assembly 140 and the sliding member 170 can be coupled via a friction-based adjustment mechanism. The friction-based adjustment mechanism can include a channel formed internally in the first arm assembly 130 and/or the second arm assembly 140 for receiving the sliding member 170. The friction-based adjustment mechanism can cause a biasing frictional force between the external surfaces of the sliding member 170 and the internal surfaces of the channel in the first arm assembly 130 and/or the second arm assembly 140. The biasing frictional force can prevent the sliding member 170 from moving without an applied external force. For example, the biasing frictional force can prevent the weight of the first earpiece 110 or the second earpiece 120 from moving the sliding member 170. The channel size and sliding member 170 thickness can be optimized and designed so that the biasing frictional force has a predetermined force range that is overcome before the sliding member 170 can be moved. In some embodiments, the sliding member 170 can include a surface and/or surface treatment that can be applied to adjust the biasing frictional force needed to move the sliding member 170.

The sliding member 170 can adjust the size of the headphones 100 to adapt the headphones to provide a more comfortable fit for users. For example, sliding member 170 can be positioned: to minimize the distance between the first earpiece 110 and the distal end of the first arm assembly 130 and the second earpiece 120 and the distal end of the second arm assembly 140; to maximize the distance between the first earpiece 110 and the distal end of the first arm assembly 130 and the second earpiece 120 and the distal end of the second arm assembly 140; or at a position between the maximized distance and the minimized distance.

In various embodiments, the sliding member 170 can be partially or fully disposed within the first arm assembly 130 and/or the second arm assembly 140 when the first arm assembly 130 and/or the second arm assembly 140 is in the folded position. A user can adjust the size of the headphones by applying a force to the sliding member 170 to overcome the biasing frictional force. In some embodiments, the force can be applied by pushing or pulling on the first earpiece 110 and/or the second earpiece 120.

The headband 150 can include a support structure and one or more layers of padding. The support structure can bias the first earpiece 110 and the second earpiece 120 a distance apart. The biased distance can be smaller than a user's head width, requiring users to apply a force to separate the first earpiece 110 and the second earpiece 120 before wearing the headphones 100. The biasing force can also hold the headphones 100 on a user's head while the user is wearing the headphones 100. The padding can be positioned between the user's head and the support structure to improve the comfort of the headphones 100 for the user. In some embodiments, the padding can be covered with a layer of protective material, for example, leather.

Figure 2A:
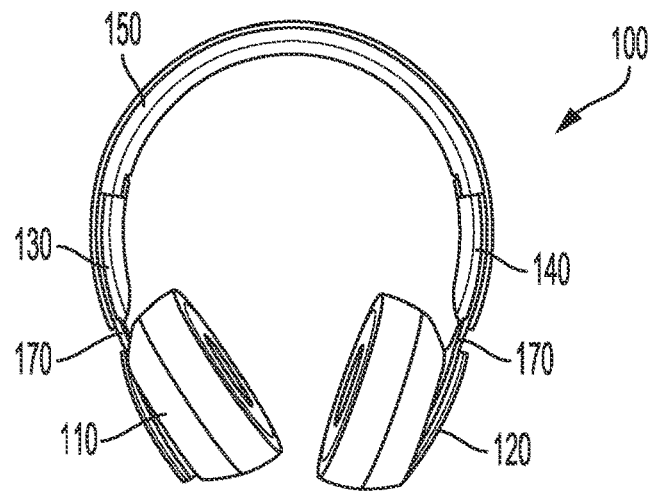
FIGS. 2A through 2C are illustrations of different configurations of the headphones of FIG. 1 according to some embodiments of the present invention.
Figure 2B:
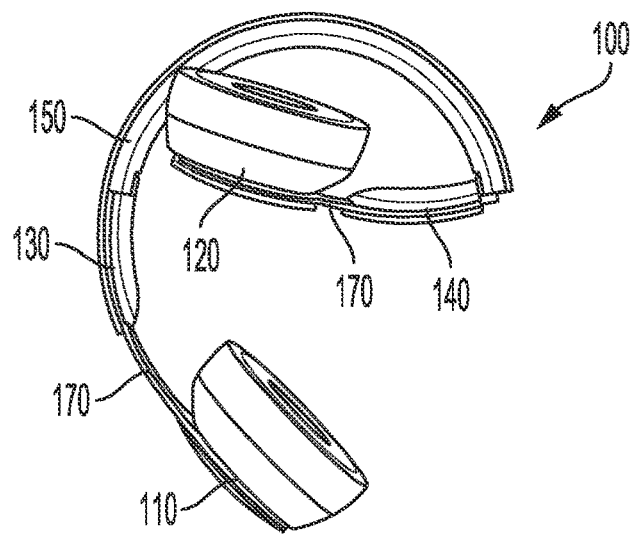
Figure 2C:
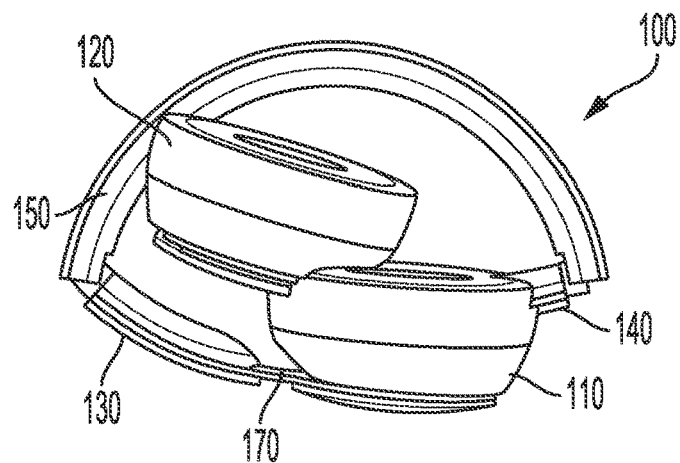

FIGS. 2A through 2C are illustrations of different configurations of the headphones 100 of FIG. 1 according to some embodiments of the present invention. In FIG. 2A, the headphones 100 are in a listening configuration; in FIG. 2B, the headphones 100 are in a standby configuration; and in FIG. 2C the headphones 100 are in storage configuration.

In FIG. 2A, the headphones 100 are in a listening configuration with both the first earpiece 110 and the second earpiece 120 extending away from the headband enabling the headphones to be worn by a user with the earpieces positioned over the user's ear. In the listening configuration, headphones 100 can be fully powered ON to provide audio playback to the user by outputting audio data received from an electronic connected to the headphones (e.g., via either a wired or wireless connection) through the speakers in each earpiece.

A user can activate a sleep mode of headphones 100 by folding one of the first earpiece 110 or the second earpiece 120 inward towards the headband 150 as shown in FIG. 2B. For example, as shown in FIG. 2B, second arm assembly 140 (and thus second earpiece 120) are folded inward towards headband 150 placing the headphones 100 in low power, standby mode to reduce the battery consumption of the headphones 100. The standby mode can reduce power consumption by reducing power supplied to one or more components. For example, audio playback can be stopped and the power supplied to wireless communication circuitry can be reduced and/or stopped. The standby mode reduces power consumption of the headphones 100, increasing the length of operating time before the headphones 100 need to be recharged. For example, in some embodiments the headphones can operate in the standby mode approximately five times longer than they could operate in the playback mode.

A user can turn the headphones OFF (or place them in a low power mode that uses even less battery consumption than sleep mode) by folding both the first and second earpieces 110 and 120 inward towards the headband 150 as shown in FIG. 2C, which places the headphones 100 in a configuration that is convenient for storing the headphones in an appropriate case or similar storage component. In some embodiments the OFF power mode power is withheld from substantially all of the electronic components in the headphones except those that allow the headphones to be turned back on. In other embodiments, the OFF power mode can continue to supply power to certain more components that provide desired functionality but switch power off to a sufficient number of components such that the headphones require less power than required in sleep mode or in the playback mode.

The headphones 100 can include control circuitry and/or associated components (e.g., one or more sensors as discussed below) to detect when one or both of the first earpiece 110 or the second earpiece 120 are in the folded or unfolded positions and activate the appropriate operational mode based on the earpiece positions. The control circuitry and/or associated components can automatically put the headphones 100 in the standby mode when it detects that one of the first earpiece 110 or second earpiece 120 is in the folded position and the other is in the unfolded position. In the standby mode, the audio playback can be stopped to one or both of the first earpiece 110 or second earpiece 120. The control circuitry and/or associated components can further automatically put the headphones 100 in the OFF mode in response to when it detects that both the first earpiece 110 and the second earpiece 120 have been folded inward towards the headband 150.

Conversely, the control circuitry and associated components can deactivate the sleep mode or the OFF mode and place the headphones in playback mode when it detects that both of the earpieces are in the unfolded (i.e., extended) position. For example, the headphones 100 can be reconfigured from the storage configuration to the standby configuration by unfolding one of the first earpiece 110 or second earpiece 120 or to the listening configuration by unfolding both of the first earpiece 110 and second earpiece 120. When the headphones 100 are reconfigured, the control circuitry and associated components detect the change in configuration of the headphones and can automatically transition the headphones from the OFF mode to the standby mode or to the playback mode as appropriate.

While embodiments of the disclosure enable headphones 100 to be placed in different operational modes by folding or unfolding the first and second earpieces as discussed above, some embodiments can also include additional user input mechanisms that enable a user to select or change an operational mode of the headphones. As one example, some embodiments can include one or more buttons (e.g., on the outer surface of one of the earpieces) that can be selected or activated by a user to switch the headphones between playback, sleep and OFF modes. As another example, some embodiments can include voice activated controls that enable a user to switch the headphones between the different operational modes.

Figure 3A:
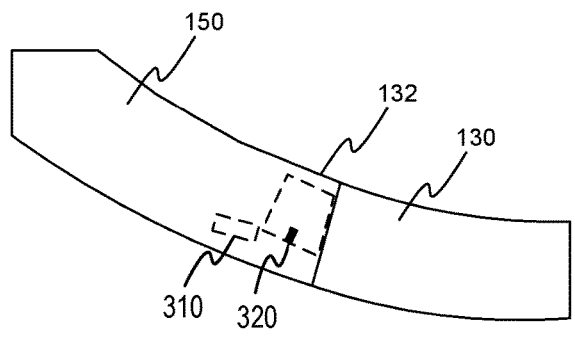
FIGS. 3A and 3B are simplified illustrations of a sensor that can be used with the headphones of FIG. 1 according to some embodiments of the present invention.
Figure 3B:
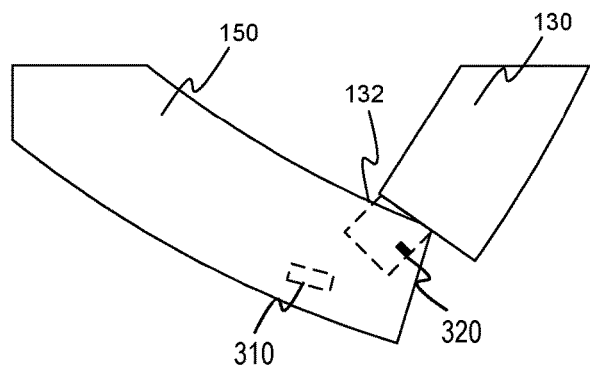

FIGS. 3A and 3B are simplified illustrations of a sensor 310 that can be used with the headphones 100 of FIG. 1 according to some embodiments of the present invention. The sensor 310 can provide data to the controller for controlling functions of the headphones. The sensor 310 is shown as positioned in headband 150, however, sensor 310 can be positioned in the first earpiece 110, the first arm assembly 130, the second earpiece 120, and/or the second arm assembly 140. FIGS. 3A and 3B are discussed in relation to the first arm assembly 130, but it is to be understood that the second arm assembly 140 can also include a sensor similar or identical to sensor 310.

In various embodiments, the sensor 310 can detect a position of the first earpiece 110 and/or the first arm assembly 130. For example, the sensor 310 can detect whether the earpiece is folded inward towards the headband, extended away from the headband, and/or at a position between the two. The position of the first arm assembly 130 can be used by the controller to determine whether to transition the headphones 100 to the playback mode, the standby mode, or the off mode. The sensor 310 can include a mechanical sensor, an optical sensor, an electronic sensor, and/or any suitable sensor for sensing the position of the first earpiece 110 and/or the first arm assembly 130.

In some embodiments, the sensor 310 can include a hall effect sensor that can sense a position of a magnet 320 relative to the sensor 310. As the magnet 320 is moved relative to the sensor 310, a voltage change can occur in the sensor 310. The sensor 310 can be positioned in the headband 150 and the magnet 320 can be positioned in the first arm assembly 130. The magnet 320 can be positioned in the first arm assembly 130 at pivot joint 132, such that, when the first arm assembly 130 is in an extended position, the magnet 320 is closer to the sensor 310 than when the first arm assembly 130 is in the folded position. For example, as shown in FIG. 3A, the first arm assembly 130 is in the extended position and the sensor 310 is positioned near the magnet 320. In FIG. 3B, the first arm assembly 130 has been reconfigured from the extended position to the folded position and the magnet 320 has moved away from sensor 310. The movement of the magnet 320 relative to the sensor 310 can cause a voltage change in the sensor 310. The controller can use the voltage change in the sensor 310 to determine a position of the first arm assembly 130.

Figure 4:
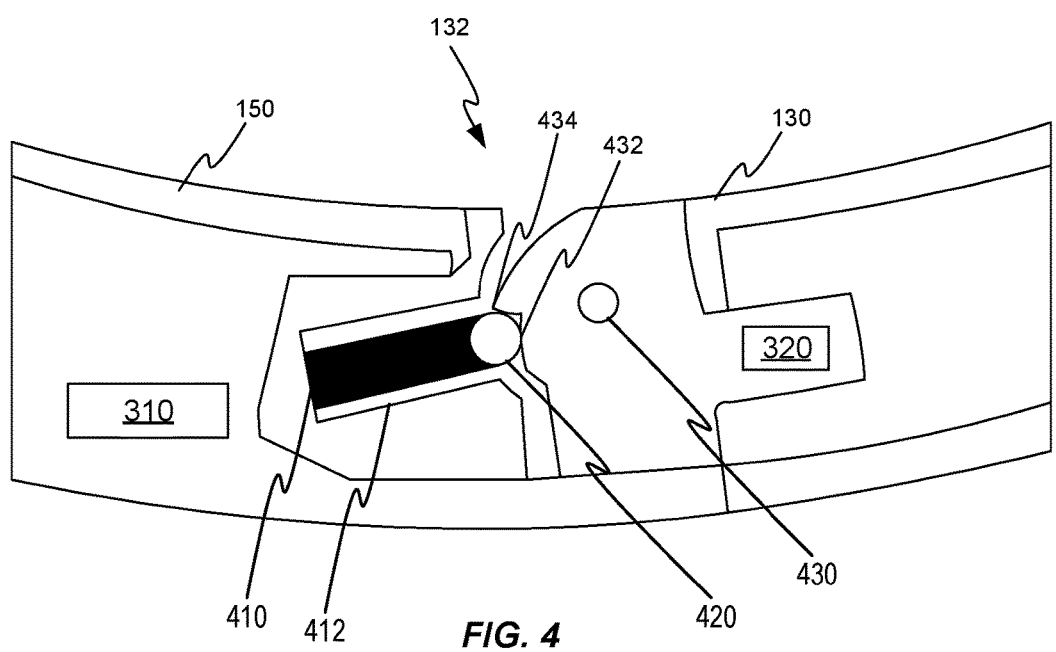
FIG. 4 is a cross section of a hinge that can be used with the headphones of FIG. 1 according to some embodiments of the present invention.

FIG. 4 is a cross-section of a pivot joint 132 that can be incorporated into the headphones 100 of FIG. 1 according to some embodiments of the present invention. As shown, the pivot joint 132 can be used to couple a first end of the headband 150 with the first arm assembly 130. However, the pivot joint 132 can additionally or alternatively couple a second end of the headband 150 with the second arm assembly 140. The pivot joint 132 can include a compressible component 410 that can apply a retention force to a stop 420, increasing the force required to pivot the first arm assembly 130.

The compressible component 410 can apply a force to the stop 420 to hold the stop 420 against a pivot surface 432. The compressible component 410 can be contained in a channel 412 to prevent the compressible component 410 from moving or flexing out of position. In various embodiments, the compressible component 410 can compress in response to the stop 420 moving. The stop 420 can move in response to the first arm assembly 130 rotating about rotation point 430. In some embodiments, the pivot surface 432 can include a cliff 434, that can increase the force required to move the stop 420 and compress the compressible component 410. For example, as the first arm assembly 130 rotates about rotation point 430, the cliff 434 can push the stop 420 against the compressible component 410. The compressible component 410 can resist the stop 420, preventing the first arm assembly 130 from pivoting until a predetermined force has been applied to the first arm assembly 130. The compressible component 410 can be a spring, rubber, foam, or any suitable compressible material. The stop 420 can be a ball, a cylinder, an oval, or any suitable component.

Figure 5:
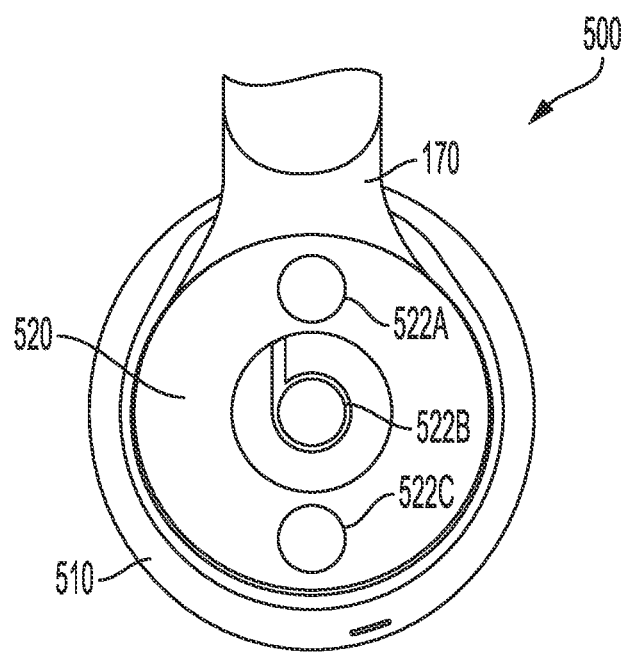
FIG. 5 is side view of an earpiece that that can be used with the headphones of FIG. 1 according to some embodiments of the present invention.

Some embodiments of the disclosure pertain to headphones that include an improved user interface on the casing of at least one of the first earpiece 110 or second earpiece 120 that enables a user to select various operational functions of the headphones. FIG. 5 is side view of an earpiece assembly 500 that that can be incorporated into the headphones 100 of FIG. 1 to provide three separate user-activated buttons behind a single, one-piece contact plate 520 according to some embodiments of the present invention. The earpiece assembly 500 can be coupled with the first arm assembly 130 and/or the second arm assembly 140 via a sliding member 170. The earpiece assembly 500 can include earpiece housing 510 and contact plate 520. The earpiece housing 510 can provide support for cushioning 112 and/or protection for electronic components (e.g., the audio output component). The earpiece housing 510 can be or include molded plastic, metal, acrylic, and/or carbon fiber.

Contact plate 520 can provide protection for one or more buttons 522 that can receive user input. The user input can control various functions of the headphones 100 (e.g., volume controls and/or audio playback controls). The contact plate 520 can be a plate that pivots about a central pivot point. The buttons 522 can be positioned beneath the contact plate 520 to allow a user to push down on a portion of the contact plate 520 to toggle one or more of the buttons. The buttons 522 can be positioned to toggle when a corresponding portion of the contact plate 520 has been pressed. For example, a first button 522A can be positioned and toggled by a user pushing on a top portion of the contact plate 520, a second button 522B can be positioned and toggled by a user pushing on a middle portion of the contact plate 520, and a third button 522C can be positioned and toggled by a user pushing on a bottom portion of the contact plate 520. In various embodiments, the contact plate 520 can include various indentations and/or surface treatments that can aid in toggling the buttons 522.

Figure 6:
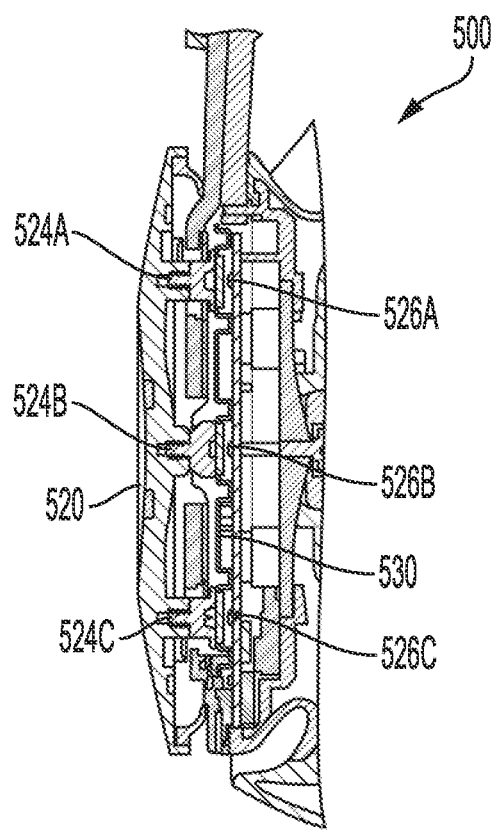
FIG. 6 is a cross section of the earpiece of FIG. 5 according to some embodiments of the present invention.

FIG. 6 is a cross section of a portion the earpiece assembly 500 of FIG. 5 according to some embodiments of the present invention. The earpiece assembly 500 can include contact plate 520 covering one or more buttons 522. The buttons 522 can include a press transfer 524 that can transfer a user's press input to one or more contact pads 526. The contact pads 526 can send a signal to the control to provide input for controlling various operations of the headphones 100. The press transfer 524 can be coupled with the contact plate 520 to maintain contact between the press transfer 524 and the contact plate 520. The press transfer 524 and the contact plate 520 can be coupled using adhesives, fasteners, and/or any suitable connection means. In some embodiments, the contact plate 520 includes receiving points for one or more press transfers. For example, the contact plate 520 can include channels for receiving a portion of the press transfer 524.

Press transfer 524 can move in response to a user pressing on the contact plate 520. For example, when a user presses on a portion of the contact plate 520, the press transfer 524 can move in response. The press transfer 524 can move until it contacts the contact pads 526. The contact pads 526 can send a signal to the controller in response to the contact from the press transfer 524. In various embodiments, the press transfers 524 and the contact pads 526 can be separated by varying distances. The varying distances can allow a user to press on the contact plate 520 without causing multiple press transfers 524 to contact their corresponding contact pads 526. For example, a press transfer 524B positioned in the middle of the contact plate 520 can be positioned closer to the contact pad 526B than press transfers 524A and/or 524C. For example, when a user presses on the middle portion of the contact plate 520, the contact plate 520 can depress, moving press transfers 524A, 524B, and 524C. However, the middle press transfer 524B can be positioned closer to its corresponding contact pad 526B to receive the press input before either of press transfer 524A or 524B are able to contact their corresponding contact plates.

In various embodiments, the press transfer 524 can act as a pivot point for the contact plate 520. One or more of the press transfers 524 can be positioned to allow the contact plate to pivot in response to a user's press. For example, a press transfer 524B can be positioned in the middle portion of the contact plate 520. The press transfer 524B can allow a user to depress the press transfer 524B by pushing on the middle portion of the contact plate 520. A user can press on the upper and/or the lower portion of the contact plate 520 to depress press transfer 524A or 524C respectively. The contact plate 520 can pivot about press transfer 524B to depress press transfer 524A or 524C without depressing press transfer 524B.

In various embodiments, the earpiece assembly 500 can include gasket 530 to prevent or reduce moisture and/or dust and debris from reaching the electronic components inside earpiece assembly 500. The gasket 530 can create a sealed barrier between the electronic components and the contact plate 520. The gasket 530 can be coupled with the one or more press transfers 524 to protect the corresponding contact pads 526. The gasket 530 can be or include rubber, silicon, or any suitable material.

What is claimed is:
1. A pair of headphones comprising:
   a headband having first and second opposing ends;

a first earpiece pivotally attached to the first end of the headband enabling the first earpiece to be moved between a first position in which the first earpiece is folded inward towards the headband and a second position in which the first earpiece is unfolded;

a second earpiece pivotally attached to the second end of the headband enabling the second earpiece to be moved between a first position in which the first earpiece is folded inward towards the headband and a second position in which the second earpiece is unfolded;

one or more sensors that generate sensor data indicating whether each of the first and second earpieces are in the first or second position;

a rechargeable battery; and control circuitry coupled to the sensor data from the one or more sensors and configured to set the pair of headphones in: (i) a playback mode when both the first and second earpieces are in the second position, (ii) in an off mode when both the first and second earpieces are in the first position, and (iii) in a third operating mode when one of the first or second earpieces is in the first position and the other of the first or second earpieces is in the second position, wherein when the pair of headphones are in the third operating mode audio playback is stopped in both the first and second earpieces and the pair of headphones consume less power than when in the playback mode but more power than when in the off mode.

2. The pair of headphones of claim 1, further comprising a pivot joint coupling the first or second earpiece with the headband, the pivot joint comprising a moveable stop for resisting pivoting, wherein movement of the stop is resisted by a compressible device.

3. The pair of headphones of claim 1, wherein the one or more sensors are positioned adjacent to a pivot join coupling the first or second earpiece with the headband.

4. The pair of headphones of claim 3, wherein the one or more sensors include a proximity sensor, a hall effect sensor, an optical sensor, or a mechanical sensor.

5. The pair of headphones of claim 1, the first or second earpiece comprising a contact plate pivotable to contact one or more buttons coupled to the control circuitry to control one or more predetermined functions.

6. The pair of headphones of claim 5, wherein the one or more predetermined functions include volume up, volume down, play, pause, next track, previous track, fast-forward, and rewind.

7. A pair of headphones comprising:
a headband having first and second opposing ends;
a first earpiece pivotally attached to the first end of the headband by a first arm enabling the first earpiece to be moved between a first position in which the first earpiece is folded inward towards the headband and a second position in which the first earpiece extends away from the headband;
a second earpiece pivotally attached to the second end of the headband by a second arm enabling the second earpiece to be moved between a first position in which the first earpiece is folded inward towards the headband and a second position in which the second earpiece extends away from the headband;
one or more sensors that generate sensor data indicating whether each of the first and second earpieces are in the first or second position; and
control circuitry coupled to the sensor data from the one or more sensors and configured to set the pair of headphones in: (i) a first operating mode when both the first and second earpieces are in the first position, (ii) in a second operating mode when both the first and second earpieces are in the second position, and (iii) in a third operating mode when one of the first or second earpieces is in the first position and the other of the first or second earpieces is in the second position, wherein when the pair of headphones are in the third operating mode, audio playback is stopped in both the first and second earpieces and the pair of headphones consume less power than when in the second operating mode but more power than when in the first operating mode.

8. The pair of headphones of claim 7, wherein the first operating mode is an off mode, the second operating mode is a playback mode, and the third operating mode is a standby mode.

9. The pair of headphones of claim 7, wherein the first or second earpiece comprises one or more buttons coupled to the control circuitry to control one or more predetermined functions.

10. The pair of headphones of claim 9, wherein the first or second earpiece comprises a contact plate pivotable to contact the one or more buttons.

11. The pair of headphones of claim 7, wherein the headband is pivotally coupled to the first arm or the second arm with a pivot joint comprising a stop for resisting pivoting of the respective arm.

12. The pair of headphones of claim 11, wherein the one or more sensors are positioned adjacent to the pivot joint and include a proximity sensor, a hall effect sensor, an optical sensor, or a mechanical sensor.

13. A pair of headphones comprising:
a headband having first and second opposing ends;
a first earpiece pivotally attached to the first end of the headband by a first arm enabling the first earpiece to be moved between a first position in which the first earpiece is folded inward towards the headband and a second position in which the first earpiece extends away from the headband;
a second earpiece pivotally attached to the second end of the headband by a second arm enabling the second earpiece to be moved between a first position in which the first earpiece is folded inward towards the headband and a second position in which the second earpiece extends away from the headband;
one or more sensors that generate sensor data indicating whether each of the first and second earpieces are in the first or second position; and
control circuitry coupled to the one or more sensors and configured to receive sensor data and set the pair of headphones in a first operating mode, a second operating mode, and a third operating mode, the control circuitry setting the pair of headphones in: (i) the first mode when both the first and second earpieces are in the second position, (ii) the second mode when both the first and second earpieces are in the first position, and (iii) the third operating mode when one of the first or second earpieces is in the first position and the other of the first or second earpieces is in the second position, wherein when the headphones are in the third operating mode, audio playback is stopped in both the first and second earpieces and the pair of headphones consume less power than in the second operating mode but more power than when in the first operating mode.

14. The pair of headphones of claim 13, wherein in the first operating mode is an off mode, the second operating mode is a playback mode, and in the third operating mode is a low power standby mode.

15. The pair of headphones of claim 13, wherein the headband is pivotally coupled to the first arm or the second arm with a pivot joint comprising a stop for resisting pivoting of the respective arm.

16. The pair of headphones of claim 13, the first earpiece or the second earpiece comprising one or more buttons coupled with the control circuitry, the control circuitry performing a predetermined function based on input from the one or more buttons.

17. The pair of headphones of claim 16, wherein the one or more buttons are covered by a contact plate pivotable to contact the one or more buttons coupled to the control circuitry to control one or more predetermined functions.

* * * * *